United States Patent [19]

Stensaas

[11] Patent Number: 4,589,226

[45] Date of Patent: May 20, 1986

[54] MICROBIOLOGICAL SYSTEMS FOR PHOSPHATE EXTRACTION AND DISTRIBUTION TO PLANT ROOT SYSTEMS

[76] Inventor: Larry J. Stensaas, 2460 Lynwood Dr., Salt Lake City, Utah 84109

[21] Appl. No.: 641,341

[22] Filed: Aug. 13, 1984

Related U.S. Application Data

[63] Continuation of Ser. No. 294,681, Aug. 20, 1981, abandoned.

[51] Int. Cl.⁴ .......................... A01G 1/04; C05F 11/08
[52] U.S. Cl. .......................................... 47/58; 47/48.5; 47/57.6; 71/6
[58] Field of Search .................... 47/58, 48.5, 58, 57.6; 71/6.7, 64.11, 32

[56] References Cited

U.S. PATENT DOCUMENTS

| | | |
|---|---|---|
| 947,795 | 2/1910 | Coates . |
| 947,796 | 2/1910 | Coates . |
| 1,252,332 | 1/1918 | Earp-Thomas . |
| 1,361,597 | 12/1920 | Lipman . |
| 1,988,307 | 3/1933 | Fay ............................................ 47/1 |
| 2,995,867 | 8/1961 | Burton ...................................... 47/1 |
| 3,059,379 | 10/1962 | Attoe et al. .......................... 47/48.5 |
| 3,115,404 | 12/1968 | Carney ...................................... 71/6 |
| 3,472,644 | 10/1969 | Woodside et al. ...................... 71/1 |
| 3,905,152 | 9/1975 | Loperfido ................................... 1/6 |
| 3,916,564 | 11/1975 | Crowell, Sr. ......................... 111/7.1 |
| 4,051,628 | 10/1977 | Knapp et al. .......................... 239/35 |
| 4,056,898 | 11/1977 | Brucato et al. ................. 47/DIG. 4 |
| 4,061,488 | 12/1977 | Mann ................................... 47/57.6 |
| 4,136,486 | 1/1979 | Franklin, Jr. et al. ............... 47/57.6 |
| 4,155,737 | 5/1979 | Dommergues et al. .................... 71/6 |
| 4,158,269 | 6/1979 | Williams et al. ...................... 111/7.1 |
| 4,224,048 | 9/1980 | Pendergast ........................... 71/64 F |
| 4,229,544 | 10/1980 | Haynes ............................. 47/57.6 X |
| 4,294,037 | 10/1981 | Mosse et al. ............................ 47/59 |
| 4,345,403 | 8/1982 | Giovannetti ........................... 47/1.1 |
| 4,367,609 | 1/1983 | Lloyd .................................. 47/57.6 |

OTHER PUBLICATIONS

Azcon et al., "Comparative Role of Phosphate in Soil or Inside the Host on the Formation and Effects of Endomycorrhiza," 49 Plant and Soil 49, 561-67 (1978).

Azcon et al., "Factors Affecting the Vesicular-Arbuscular Infection and Mycorrhizal Dependency of Thirteen Wheat Cultivars," 87 New Phytologist, 87 677-87 (1981).

(List continued on next page.)

Primary Examiner—Robert E. Bagwill
Attorney, Agent, or Firm—Workman, Nydegger & Jensen

[57] ABSTRACT

A package and method of its production, providing a means for transferring soluble phosphorus from a source supply to plant root systems without loss of phosphorus to surrounding soil structure by use of microorganisms. A source of soluble phosphorus is supported along with a plant seed and dormant, plant-beneficial microorganisms within the cell matrix of a cellulosic support device which may be formed into a configuration such as a capsule or ribbon. The cellulosic support device may also contain nutrients for encouraging plant growth upon germination of the plant seed. The fungal inoculum is obtained by propagation of the microorganism in symbiotic association with the root systems of host plants either hydroponically, or in soil, depending upon the microorganism species used. Spores, cryoprotected hyphae and the seed of a vector plant are combined at low temperature with a cellulosic material which is used to form the packages. The formed packages are rapidly freeze-dried, and stored. The carrier system is inoculated into soil and, under proper environmental conditions, the plant seed germinates and the microorganisms become active and develop a symbiotic relationship with the growing plant. Growth of the fungus in association with the roots of the vector plant distributes the microorganisms within the soil and serves to introduce them to other plants, allowing the microorganisms to recover phosphorus and other constituents from the soil and to deliver them to their host plant by a process of translocation. The growing plant provides a vehicle for inoculating other nearby plant roots with the microorganisms.

69 Claims, 6 Drawing Figures

OTHER PUBLICATIONS

Barea et al., "Possible Synergistic Interactions Between Endogone and Phosphate-Solubilizing Bacteria in Low-Phosphate Soils," Endomycorrhizas (Ed. by Sanders, Mosse, Tinker) 408-17 (1975).

Barea et al., "Effects of Introduced and Indigenous VA Mycorrhizal Fungi on Nodulation, Growth and Nutrition of Medicago Sativa in Phosphate-Fixing Soils as Affected by Fertilizers," 54 Plant and Soil, 283-96 (1980).

Black et al., "The Development of Endomycorrhizal Root Systems. II. Effect of Agronomic Factors and Soil Conditions on the Development of Vesicular-Arbuscular Mycorrhizal Infection in Barley and on the Endophyte Spore Density," 83 New Phytologist, 401-13 (1979).

Bowen et al., "Phosphate Physiology of Vesicular-Arbuscular Mycorrhizas," Endomycorrhizas (Ed. by Sanders, Mosse, Tinker) 241-58 (1975).

Callow et al., "Detection and Estimation of Polyphosphate in Vesicular-Arbuscular Mycorrhizas," 80 New Phytologist, 125-34 (1978).

Cooper et al., "Translocation and Transfer of Nutrients in Vesicular-Arbuscular Mycorrhizas. II. Uptake and Translocation of Phosphorus, Zinc and Sulphur," 81 New Phytologist, 43-52 (1978).

Cooper et al., "Nutrients in Vesicular-Arbuscular Mycorrhizas. IV. Effect of Environmental Variables on Movement of Phosphorus," 85 New Phytologist, 312-38 (1981).

Cox, et al., "Ultrastructure of the Host-Fungus Interface in a Vesicular-Arbuscular Mycorrhiza," 73 New Phytologist, 901-12 (1974).

Cox et al., "Translocation and Transfer of Nutrients in Vesicular-Arbuscular Mycorrhizas. III. Polyphosphate Granules and Phosphorus Translocation," 84 New Phytologist, 649-59 (1980).

Crush et al., "Preliminary Results on the Production of Vesicular-Arbuscular Mycorrhizal Inoculum by Freeze Drying," Endomycorrhizas (Ed. by Sanders, Mosse, Tinker) 485-93 (1975).

Daniels et al., "Glomus Epigaeus sp. nov., A Useful Fungus for Vesicular-Arbuscular Mycorrhizal Research," 57 Canadian Journal of Botany, 539-42 (1979).

Daniels et al., "Evaluation of the Commercial Potential of the Vesicular-Arbuscular Mycorrhizal Fungus, Glomus Epagaeus," 85 New Phytologist, 344-54 (1981).

Hall, "Soil Pellets to Introduce Vesicular-Arbuscular Mycorrhizal Fungi into Soil," 11 Soil Biology Chemistry, 85-86 (1979).

MICROBIOLOGICAL SYSTEMS FOR PHOSPHATE EXTRACTION AND DISTRIBUTION TO PLANT ROOT SYSTEMS

This application is a continuation of U.S. application Ser. No. 294,681, filed Aug. 20, 1981 for MICROBIOLOGICAL SYSTEMS FOR PHOSPHATE EXTRACTION AND DISTRIBUTION TO PLANT ROOT SYSTEMS, now abandoned.

BACKGROUND

1. Field of the Invention

The present invention relates to plant fertilization systems, and more particularly to the use of microorganisms for extracting phosphorus from soil, rock phosphate, or commercially refined phosphate sources and distributing these materials to plant root systems without absorptive loss to clay minerals and other soil constituents. The present invention also relates to the use of microorganisms in plant nourishment and, more particularly, to an improved method and apparatus for producing, packaging and deploying beneficial symbiotic mycorrhizal fungi in association with crop or other plants to enhance recovery of phosphorus, water and other constituents from the soil.

2. The Prior Art

It is well known that phosphorus is one of the elemental constituents essential to the growth of plants. It is also generally known that phosphorus must be in a water soluble form in order to be utilized by plants and that most soils are deficient in such soluble forms of phosphorus.

Nevertheless, many soils have moderate to high levels of insoluble or unavailable phosphorus in the form of natural minerals, organic phosphorus compounds, and clay minerals containing adsorbed phosphorus.

In order to satisfy the continuing agricultural need for soluble phosphorus, commercial refinement processes have been utilized to obtain soluble phosphorus from rock phosphates which are soluble in acid. Such processes are not only complex and energy-intensive, but they require "high-grade" rock phosphate, the natural United States sources of which are rapidly becoming depleted.

A high proportion, often in excess of sixty percent (60%), of the soluble phosphorus applied to argillaceous soils is lost due to the rapid adsorption of phosphorus by clay minerals and iron, or by its incorporation into organic compounds and other soil constituents. The phosphorus becomes irreversibly adsorbed by the clay minerals, leading to permanent loss of much of the soluble phosphorus applied to the soil.

A further problem with direct application of phosphorus to the rhizosphere of the plant root system is a condition referred to as phosphorus toxicity. This condition occurs when the phosphorus within a plant exceeds optimal levels and may result in the stunting of the plant's growth. Thus, the application of an initially high level of phosphorus to the soil may, in fact, cause decreased growth of plants.

In seeking to overcome these problems, attempts have previously been made to utilize unrefined rockphosphates or microorganisms or combinations thereof in a soil environment near plant root systems to provide suitable phosphorus to those root systems. These attempts have been based on the understanding that soluble phosphorus is slowly made available to plants by the breakdown of natural minerals and organic phosphorus compound through the action of microorganisms, as well as by organic and inorganic acids. Such attempts are reflected in the disclosures of U.S. Pat. Nos. 947,795, 1,361,597, and 4,155,737. However, these attempts have not succeeded in creating a microenvironment suitably capable of growing phospholytic microorganisms or breaking down certain phosphorous compounds by naturally occurring acids.

Some of the prior attempts to overcome the abovedescribed problems have been able to provide a source of soluble phosphorus, which may be placed in the soil, however, no means has been provided for preventing loss of this soluble phosphorus through adsorption by clay minerals.

In the past, attempts to produce soluble phosphate from existing insoluble sources within the soil have generally been unworkable. Most soils in temperate climates do not provide the conditions of low pH which are conducive to the spontaneous and direct conversion of insoluble forms of phosphorus to soluble forms of phosphorus. Insolubility in most of these instances is related to a neutral or alkaline soil pH. Thus, the problem of providing a substantial mineral or other natural source of soluble phosphate for the plant root system has not been suitably solved by the prior art.

It is well known that plants grown in soils which are deficient in soluble phosphorus benefit from association with mycorrhizal fungi (hereinafter referred to as MF). Such associations are formed by fungi belonging to the family Endogonaceae which constitute two morphological groups: (1) Ectomycorrhizae form principally on the roots of woody plants which include economically important families of forest trees. (2) Endomycorrhizae, also commonly known as vesicular-arbuscular mycorrhizae (hereinafter VAM), colonize the roots of most food crop plants and are the principal subject of this patent application. Both the endomycorrhizal and ectomycorrhizal fungi develop symbiotic associations with feeder roots of the plant root system, receiving carbohydrates and other nourishment from the plant while directly benefiting the plant by transferring to it phosphorus, water, and other constitutents from the soil through a hyphal network.

The efficiency of phosphorus uptake from soils deficient in soluble phosphorus is greater for MF than for root cells of the host plant. This is because the MF have a lower threshold for phosphorus retrieval. Furthermore, the ability of the fungus to form an extensive hyphal network in the soil surrounding the plant root permits phosphorus recovery from a large volume of soil since there may be up to 80 cm of hyphae for each cm of root infected by vesicular-arbuscular endomycorrhizal fungi. Individual hyphae project up to 10 cm from the root system of the host plant, thereby penetrating the zone of depletion adjacent to the root cortex and greatly extending the effective volume of soil from which phosphorus, water and other constituents can be extracted.

Phosphorus transfer from the soil to the plant is accomplished within MF by a process termed translocation. MF first concentrate the extracted phosphorus in polyphosphate granules within the cell cytoplasm and the move the granules within the hyphae of the external hyphal net by means of bulk flow and possibly by means of active transport using cytoskeletal elements. Soluble phosphorus is delivered into the plant through an internal hyphal net whose specialized arbuscles are intimately associated with cells of the root cortex. In vitro laboratory tests have demonstrated that these fungi may also be capable of translocating soluble phosphorus from a plant with high levels of phosphorus to a plant which is deficient in phosphorus; however, attempts to demonstrate this in the field have been inconclusive.

The main problem encountered in attempting to use endo-MF for transferring soluble phosphorus is that it has not been possible to produce these fungi in sufficient quantities to make their use feasible except on an experimental basis. It has not been possible to induce endo-MF to propogate and ensporulate by means of in vitro culture techniques; moreover, methods of producing large quantities of fungal concentrates have also not been developed. Further, storage for extended periods of time or transportation of active fungi has been impractical since active fungi must be retained either in culture or in soil. Since neither growth nor reproduction has been achieved by means of culture methods, storage of the endo-MF for extended times is impractical because of the extensive physical care required in keeping the endo-MF active in the in vitro culture medium or in soil. Incorporation of either moist or lyophyllized (freeze-dried) propagules of endo-MF into pellets formed of soil, bentonite clay or calcium carbonate have not provided as efficient mode of plant inoculation as pre-inoculation or the use of large quantities of active endo-MF situated beneath the root system of an uninfected plant. Further, it has been found that direct introduction of endo-MF into many soils is not possible because these fungi are not able to compete with existing soil organisms, and because suitable conditions for their establishment within the soil environment do not exist without association with a plant host.

Thus, none of the above-described methods and devices provide a full and workable solution to the problem of supplying soluble phosphorus to plant root systems either in sufficient quantity or without loss through adsorption by clay minerals or other constituents of the soil. What is needed to fully overcome the deficiencies of the prior art is a means for the controlled mobilization of soluble phosphorus from one or more sources and its transfer to plant root systems without appreciable loss to clay minerals and other adsorptive constitutents within the surrounding soil. It would be a further important improvement to provide a means for supplying phosphorus to plant systems from unrefined sources of rock phosphate. Another desirable improvement would be to provide a phosphorous supply which would be available over an extended period of time, such that the plant nutrient requirements are met without phosphorus toxicity. A still further advance in the art would be to provide a means for balancing the phosphorus levels so as to transfer phosphorus from plants which have excess phosphorus to those deficient in phosphorus.

In accomplishing this, what is also needed is a practical means by which VAM fungi can be used for encouraging plant growth in commercial applications. This would require a method for mass producing efficient species of MF in sufficient quantities for large-scale distribution. This would also require that the fungi remain viable, even after storage, transport and implantation into the soil. In addition, the fungi would also have to rapidly colonize the roots of host plants so that the latter may benefit from the transfer of phosphorus and other soil constituents.

BRIEF SUMMARY AND OBJECTS OF THE INVENTION

The phosphorus extraction and distribution system of the present invention is comprised of a source of phosphorus surrounded by a cellulosic matrix which contains fungal microorganisms such as mycorrhizal fungi which are capable of translocating phosphorus emanating from the phosphorous source to a plant root system.

The cellulosic matrix may additionally have nutrient or hormonal materials for encouraging the growth and development of the MF, together with a plant seed which becomes a host plant to serve as a vector for introducing mycorrhizal fungi to other nearby plants after the system is introduced or implanted into the soil under proper conditions.

In one case, the phosphorous source is comprised of refined soluble phosphorus which is formed into pellets and treated to ensure the timed release of phosphorus. Optionally, the phosphorous source may be comprised of one or more pellets containing a mixture of finely ground particles of rock phosphate, bacteria whose enzymes are capable of solubilizing phosphorus from relatively insoluble compounds, bacterial nutrients, a low pH hydrogel, and a binder matrix. The nutrients and low pH hydrogel provide a suitable microenvironment for growth of the bacteria which act upon the rock phosphate to produce a source of soluble phosphorus within the cellulosic matrix.

Mycorrhizal fungi are produced by two methods. By the first method, the root systems of host plants are inoculated with the fungus and both are grown hydroponically. Following a period of vegetative growth, ensporulation and dormancy in hyphae of the MF is induced. The latter may involve a combination of plant maturation, harvesting of the fruit or leafy portions of the host plant, and regulated reduction of such environmental conditions as temperature, nutrients, root gases, light, and moisture.

According to the second method, epigeous species of MF are employed which produce sporocarps above the soil surface. They are grown in association with host plants such as grasses, which can be cut periodically so as to allow the sporocarps to be harvested together with the shoots of the host.

The MF propagules produced from the first method are then cryoprotected; both types of propagules are then dissociated and mixed with a cellulosic vehicle. A package is formed by extrusion into pellets or by use of paper product technology to form ribbons, pledgets or capsules, and the package freeze-dried under regulated conditions, and covered by a membrane permeable to water soluble constituents which will retain the plant root during its initial growth stages. All packages are fabricated so as to include the seed of an appropriate host plant.

The resulting packages may be stored until the time of their inoculation into the soil, and they may be transported without damage to the dormant MF or plant seeds contained therein. Upon planting, conditions in the soil and in the capsule will allow the MF to leave the dormant state and begin growth in association with the plant host.

After inoculation of the package into soil, and under proper environmental conditions, the contained plant seed and MF germinate and begin to grow. A symbiotic relationship develops between the growing plant root system and MF of the package such that the microorganisms are deployed with the soil by growth of the fungi in association with roots of the vector plant host and are thereby also introduced to the roots of adjacent plants. Thus, the MF microorganisms form an extensive network interconnecting the root systems of several plants so that the roots provide nourishment to the MF, and the MF microorganisms transfer phosphorus from the package to the plant as the phosphorus emanates from the intracapsular source.

Phosphorus may be transferred by MF both from the phosphorous source and from host plants containing a high concentration of phosphorus to adjacent phosphorus-deficient plants. Additionally, portions of the microorganisms extending into the soil may secure phosphorus from the soil and translocate the phosphorus to the associated plants. Loss of the soluble phosphorus to clay minerals of the soil is either minimized for does not occur during the transfer of phosphorus since translocation is accomplished intracellularly through the microorganism.

It is, therefore, a primary object of the present invention to provide a system for the biological transfer of soluble phosphorus to plant root systems without substantial loss through adsorption to clay minerals and other constituents of the surrounding soil.

Another object of the present invention is to provide a source of soluble phosphorus which may be positioned in the soil adjacent to plant root systems and which is subject to a time release mechanism so that damage to plants due to phosphorus toxicity can be minimized or avoided.

Still another object of the present invention is to provide a means for introducing a phosphorous source in conjunction with mycorrhizal fungi so as to inoculate the soil with such microorganisms and provide a means for establishing a symbiotic relationship between the mycorrhizal fungi microorganisms and surrounding plant root systems.

A further primary object of the present invention is to provide an improved method for propagating and mass producing mycorrhizal fungi.

Another object of the present invention is to provide a means for inducing dormancy within mycorrhizal fungi so as to ensure viability, and to provide a convenient and safe condition for storage and transportation.

Still another object of the present invention is to provide a means of packaging the dormant mycorrhizal fungi so as to form a convenient and effective means for their subsequent introduction into the soil.

A further object of the present invention is to provide a host plant vector in conjunction with the phosphorous source to introduce and distribute mycorrhizal fungi to the soil and to adjacent plants and to buffer and transport phosphorus through the host plant root system and through the attached fungi to the roots of adjacent plants.

These and other objects and features of the present invention will become more fully apparent from the following description and appended claims taken in conjunction with the accompanying drawings.

DETAILED DESCRIPTION OF THE PREFERRED EMBODIMENT

Reference is now made to the Figures wherin like parts are designated with like numerals throughout.

Figure 1:
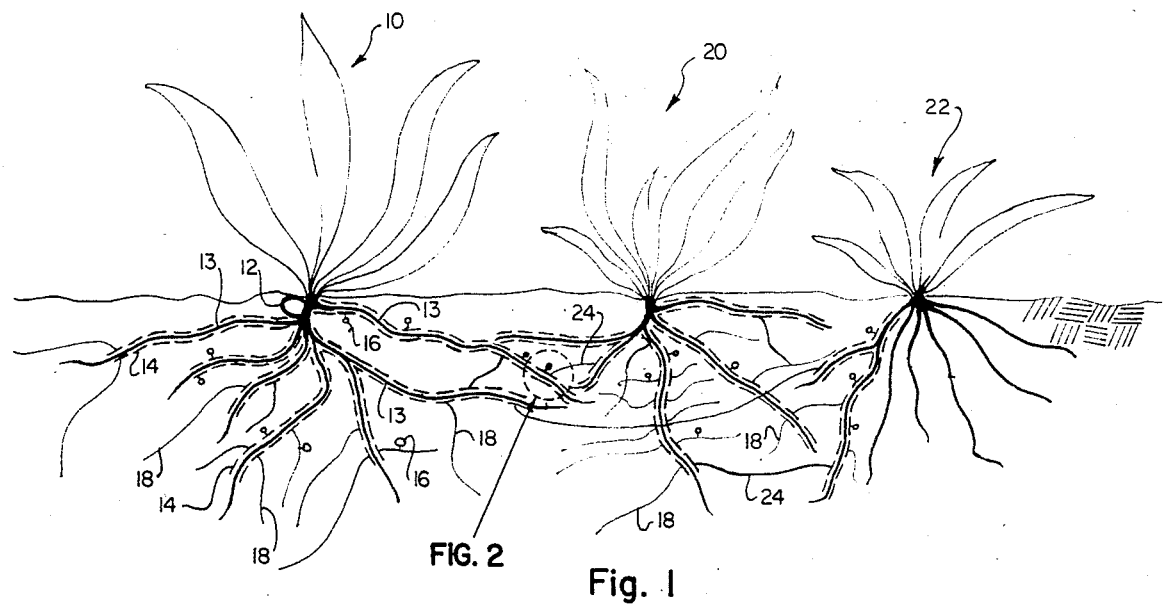
FIG. 1 is a schematic representation of the present invention as it functions in conjunction with the root systems of plants.

Referring initially to FIG. 1, the invention is illustrated as it actually functions in conjunction with plant root systems. In this figure the host or "vector" plant, generally designated at 10, is shown in a growth state with the source capsule 12 affixed to the upper portion of the root system 13 of plant 10. As will be described more fully hereafter, vector plant 10 was initially contained within capsule 12 as a seed, along with one or more sources of soluble phosphorus and propropagules of either ectomycorrhizal or of endomycorrhizal fungi which are in a dormant state.

Vector plant 10 is an important constitutent in this system with respect to both the propagation and the distribution of the MF on plants in the soil environment. It is essentially impossible to introduce MF into a soil environment and have the MF survive without an initial association of the MF with a plant. As is discussed more fully hereafter, this initial association is encouraged by including in the capsule the seed of vector plant 10. By initially developing this necessary relationship with plant 10, the MF are provided with the nutrients necessary for sustaining their growth.

As vector plant 10 grows, its extending roots provide additional cells to be colonized by the MF which also grow outward and/or downward so as to introduce the MF throughout a large volume of soil and to other plants 20 and 22 whose seeds were planted later and/or situated more superficially. The vector plant 10 is selected for its ability to grow and to establish an extensive root system prior to that of the crop plant and is intended to supply with phosphorus. In addition, when vector plant 10 comprises a perennial plant, it provides a long-term host for the MF such that these fungi may be kept viable in the soil surrounding plant 10 over periods of several years, while maintaining a symbiotic relationship with vector plant 10.

As vector plant 10 sprouts and grows, the MF within capsule 12 become activated and form a symbiotic relationship with the root system 13 of plant 10. The MF fungi are nourished by carbohydrates and other chemical exudates produced within roots of the growing plant 10. While receiving nourishment, the MF secure phosphorus from the surrounding soil and translocate this phosphorus to the root system of plant 10. Vector plant 10 may be one of several plant varieties having a tolerance for phosphorus which would enable it to continue to grow even in the presence of temporarily high phosphorus levels; this allows the vector plant to serve both as a reservoir and as a buffer for phosphorus prior to its transfer to other plants.

Figure 2:
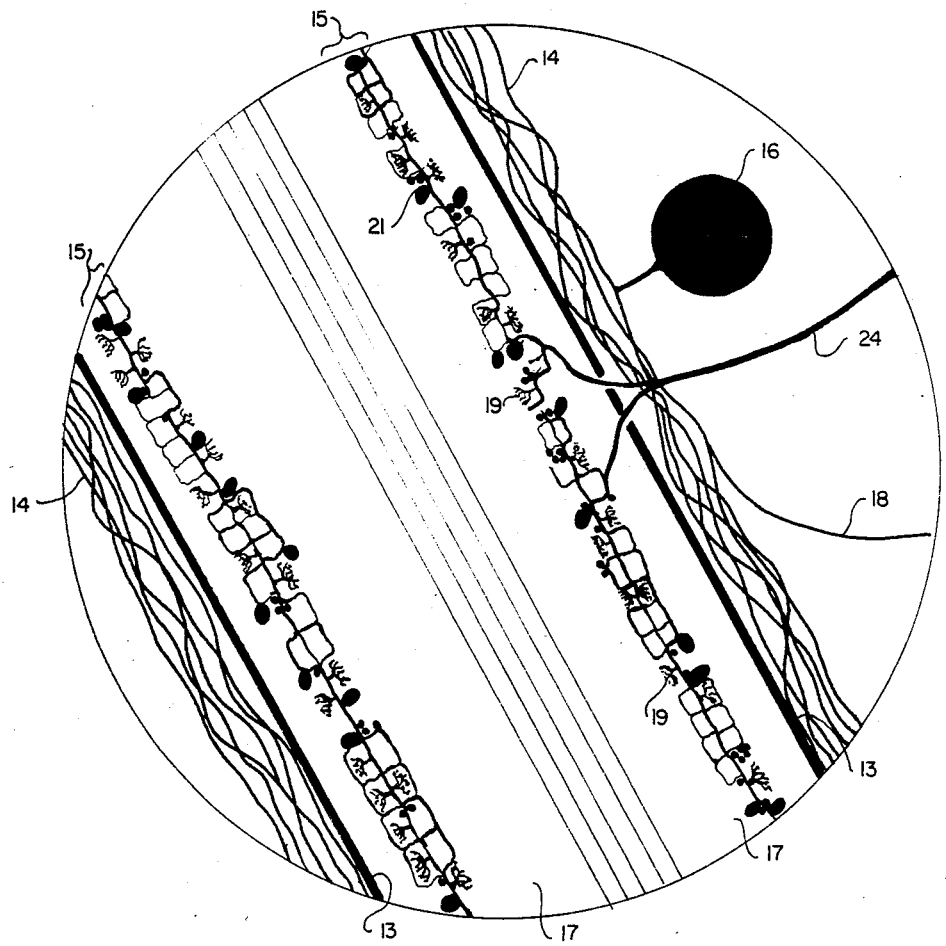
FIG. 2 is a magnified schematic cross-section illustrating that portion of the root system identified at 2 in FIG. 1.

By reference to FIG. 2 taken in conjunction with FIG. 1, it is seen that the morphology of MF may appear in several forms. Ectomycorrhizae form morphologically specialized associations with the plant root 13 consisting of a dense external net 14 or "mycelium" on the surface of root 13 and a dense internal net 15 (FIG. 2) located in the root cortex 17. Endomycorrhizae give rise to less dense external and internal hyphae nets in association with the root with the latter having characteristics arbuscules 19 and vesicles 21.

Hyphae arising from the external net 14 may extend several centimeters from the root of the host plant 10. These hyphae may bear spores or sporocarps 16 or they may extend outward to end blindly and may serve to recover nutrients from surrounding soils or other sources. Such hyphae, which do not infect or interconnect roots, and which secure phosphorus or other nutrients from the surrounding soil, may be referred to as soil hyphae 18.

As the roots of vector plant 10 grow, successively more distal portions become infected by MF which are thus carried deeper into the soil. The roots 13 and MF may also grow outward into the soil and will subsequently be encountered by the root systems of other plants such as those of plants 20 and 22 in FIG. 1. In addition to an initial relationship with plant 10, MF will establish a symbiotic association with the other plants 20 and 22. Hyphal connections between the roots of the other plants 20 or 22 are referred to as inter-root hyphae 24.

Through the inter-root hyphae 24, MF may transfer phosphorus from a plant containing a high concentration of phosphorus to one or more plants with a lower concentration. Thus, if a plant 10 has a high level of phosphorus, phosphorus may be translocated to a phosphorus-deficient plant through inter-root hyphae 24. In this manner, the MF also tend to protect the plants with which they are associated from exposure to excessive amounts of phosphorus which could cause plant damage due to phosphorus toxicity. Further, since the vector plant 10 may act as a medium through which phosphorus from capsule 12 is transferred, it may serve as a reservoir and may buffer the quantity of phosphorus transferred during a given period, thereby protecting interconnected plants 20 and 22 from phosphorus toxicity.

Figure 3:
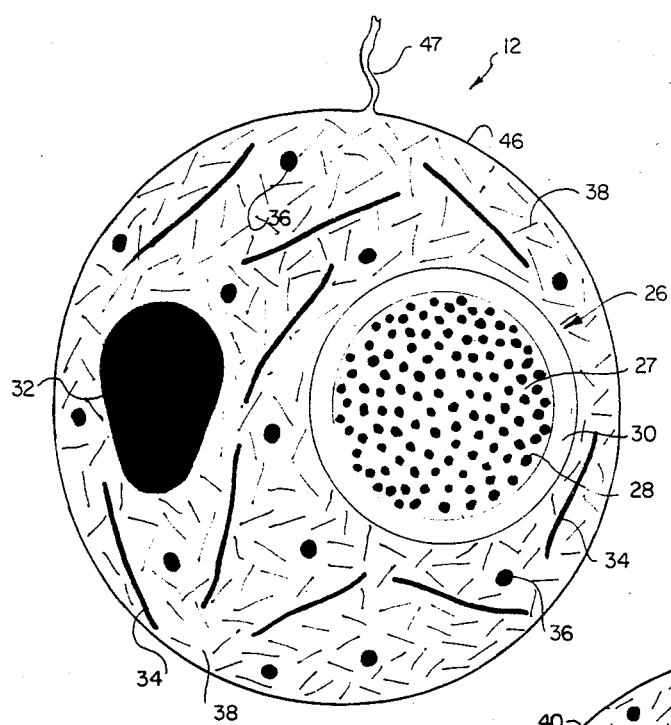
FIG. 3 is a cross-sectional illustration of a capsule which comprises one preferred embodiment of the present invention.

By reference to FIG. 3, one preferred embodiment of the capsule 12 is illustrated. Contained within the body of capsule 12 are one or more phosphate pellets, generally indicated at 26. Pellet 26 is comprised of a commercially available soluble phosphorous fertilizer 28 which has been treated with molten sulfur, a liquid epoxy resin, or another composition to provide a coating 30 which is resistant to moisture so as to provide for delayed and/or timed release of the phosphorus 28. Alternatively, compression of the fertilizer particles in association with an appropriate slowly hydratable binder or vehicle such as methylcellulose powder to form pellet 26 may accomplish the same purpose.

Also contained within capsule 12 is the seed 32 of a vector plant, which is preferably a phosphorus-tolerant species. Plant seed 32 may be selected from among phosphorus-tolerant plants of the same species or of different species as the plant species it is desired to cultivate. After germination and sprouting, plant seed 32 develops into the vector plant 10 of FIG. 1 whose root system will develop prior to that of crop plants 20 and 22.

The remaining contents of capsule 12 consist of one or more species of mycorrhizal fungi either in the form of dormant hyphae 34, dormant spores 36, or both. Of course, it will be recognized that there are multiple varieties of such fungi which could function in the necessary manner, and there are even certain types of bacteria which could participate in this process (such as some actinomycete species).

The above-discussed items contained within capsule 12 are surrounded by a cellulose matrix 38 which is comprised of a mixture of substances, such as sphagnum moss, paper pulp, or dissociated plant roots and shoots. This matrix is combined with an adhesive material such as methylcellulose or is otherwise prepared so that the cellulosic material will retain a preferred shape in order to facilitate storage, transport and ultimately, the implantation of capsule 12 into the soil.

The exterior of capsule 12 is enclosed by a membrane 46 which is permeable at least to water but is strong enough to temporarily contain the developing root from the plant seed 32 within the capsule and in proximity to the MF hyphae 34 and spores 36, so as to insure inoculation of the root by hyphae 34 and spores 36. As the root of plant seed 32 continues to grow it causes expansion of membrane 46 so as to extend outward through a root passage 47 in the membrane 46 or through optional holes (not shown) in the membrane surface. Continued root growth is not impeded by the ruptured membrane 46. Membrane 46 can be comprised of one or more polymeric materials such as cellophane which is wrapped around capsule 12, or polyurethane which is coated upon the surface of capsule 12.

It will be recognized that other organisms could be included with or substituted for the VAM fungi and still achieve acceptable results. For example, certain species of ectomycorrhizal fungi or actinomycete bacteria may be capable of functioning in a manner similar to the VAM fungi in transporting phosphorus, water and other constituents to plant root systems. These or similar organisms could easily be used in the packages described herein, and such use of other organisms is considered to be within the scope of the invention described and claimed herein.

Prior methods of soil inoculation utilizing endomycorrhizal fungi have been based upon the use of living active fungi. In the active state, fungi could neither be effectively stored nor transported in a manner which would permit their use on a large scale or commercial basis. However, it has been found that these fungi are capable of entering a dormant state so that they can become active at a later time under proper environmental conditions.

Despite numerous attempts, no one has successfully propagated MF by means of pure in vitro culture techniques or caused MF in such preparations to become dormant or to ensporulate. However, by use of processes described herein it is possible to induce MF to ensporulate or to produce dormant hyphae, thereby yielding an effective preparation of fungal propagules which may be activated following introduction into the soil, and which may be used to inoculate crop or other plants.

The novel method of inducing dormancy in the MF 34 and the production of MF spores 36, is disclosed in my copending patent application U.S. Ser. No. 294,682, filed Aug. 20, 1981 and entitled "Preparation of Microorganisms for Use in Soil Inoculation", which has been incorporated herein. This method involves two techniques. In the first preferred embodiment, the root systems of plants grown hydroponically are used to propagate VAM fungi. Inoculation is accomplished by incubating propagules (comprising germinated spores, hyphal clumps or root fragments containing active VAM fungi), in association with seedling host plants and allowing them to grow together so as to infect the roots.

In one preferred embodiment the hydroponic growth medium onto which the VAM infected seedlings are subsequently transplanted includes a cellulosic, fibrous matrix which provides both support for the growing plant and support and containment of the growing VAM fungi. This cellulosic matrix is comprised of substances such as sphagnum moss, paper, the shoots of plants or similar cellulosic materials, and may include natural fibers such as cotton, linen, and jute, or even synthetic fibers. The hydroponic support matrix used with the present invention is valuable in achieving mass production and a concentrated preparation of MF.

A deficiency of particulate support systems such as vermiculite, perlite or sand, each of which are commonly used as hydroponic support matrices, is that no satisfactory means exists for separating the MF and plant from the support medium to form a concentrate amenable to incorporation into packages. However, by using filaments or fibrous materials such as those indicated above, a support matrix is provided for the plant and the fungi which is also usable as the containment vehicle for the fungi-distribution packages described hereinafter.

Growth of the host plant under hydroponic conditions is monitored and enhanced by providing optimal environmental conditions. For example, lettuce may be grown by means of a system owned by The Agrisystem Division of Whittaker Corp., wherein temperature, humidity, light-dark cycle, shoot and root gases, and root nutrients are monitored and automatically maintained within predetermined limits by means of computer-controlled feedback mechanisms.

Histological procedures are used to determine the degree of "infection", the extent of the vegetative growth of VAM fungi within the plant host and in the cellulosic matrix, and the production of spores and sporocaps. This involves the removal of a sample plant together with its associated support medium, freezing it and cutting sections of approximately 100 micrometers by means of an LKB crystat which uses tape to collect the sections. The distribution of MF hyphae and spores in and on the roots and within the support medium is determined by clearing the section with a sodium hydroxide solution, staining the fungi with trypan blue, dehydrating, mounting and examining the section microscopically. The incidence of fungi is tabulated using a Zeiss particle analyzer.

The production of spores on the external hyphae net is fostered by conditions promoting vigorous vegetative growth of the fungus. A condition of hyphal dormancy may develop subsequently and is a normal consequence of biochemical changes in the status of chemical constituents of the soil and in the plant host. However, in the case of plants such as lettuce which are grown hydroponically, dormancy may be induced in the VAM fungi by a combination of maturation of the host plant, harvesting leafy portions of the host plant, and regulated changes in the conditions of growth of the host plant, which involves a reduction of temperature, nutrients, root gases, light and moisture. Thus, the maximal production of propagules, consisting of spores, root-associated hyphae and vesicles, and support medium-associated hyphae may occur in association with the root system of plants grown under scientifically regulated conditions.

Another preferred method within the scope of the present invention for inducing ensporulation and dormancy involves use of vesicular-arbuscular endomycorrhizal fungi which develop spores in a sporocarp or spore case above ground, or epigeously. Species such as *Glomus epigaeous* are therefore grown under conditions which allow the sporocarps to be harvested periodically. Grass, for example, is a type of perennial host plant which is able to sustain the production of sporocarps, withstand periodic cutting of its shoots, and to be grown in monoculture using well-known agricultural techniques. Harvesting is carried out by cutting the plant shoots close to the ground using a conventional lawn mower and by removing both the cuttings and the sporocarps from the soil surface under vacuum by means of an agitator and suction device attached to the mower.

After dormancy has been induced in either of the above-described embodiments, those portions of the plant root systems which contain VAM fungi (including hyphae, spores and/or sporocarps) and the associated support medium are dissociated from the remainder of the plant and plant surroundings. Dissociation involves both separation of spores from dried sporocarps by vigorous agitation in a blender or similar agitating device, and separation of the microorganisms and associated support medium and plant roots from their surroundings by the processing of these constituents to reduce their size to a maximum of about 2 cm, and preferably about 1 cm. It is best to process the constituents while still moist from their growth environment in order to minimize damage to the microorganisms. Thus, the moist constituents are agitated or gently chopped so as to cause their separation into smaller particles in the size range above-indicated.

The VAM fungi are thus obtained in a dormant but viable condition. However, as is more fully described below, the subsequent preparation of the microorganisms for storage and inoculation into soil involves the processes of lyophylization (freeze-drying) of the microorganisms. The hyphae of vesicular-arbuscular endomycorrhizal fungi may or may not be adequately protected by the character of their cytoplasm or by material forming the cell wall and may not remain viable after incorporation into packages at low temperatures and after drying unless adequately protected prior to lyophylization.

A crucial aspect of such protection is prevention of damage through the formation of ice crystals both outside and inside the wall of hyphae or vesicles. This protection may be achieved through use of a process known as cryoprotection. In accord with published procedures for protecting animal cells, the VAM hyphae in association with plant roots and cellulosic growth medium, are soaked in a solution containing cryoprotectants such as glycerol and sucrose. In practice this will consist of a mixture such as 5% glycerol, and 2% sucrose or other sugar or carbohydrate-rich root exudate.

Fabrication of the packages occurs at low temperatures in order to avoid germination of the plant seed and fungal propagules. The temperature of the hyphae, spores, and plant seeds during mixing with or application to the moist packages is reduced so as to be below about 15° C. in the range of about 4° C. to about 10° C. above the freezing point of water, and preferably to be in the range of about 4° C. to about 6° C. above the freezing point of water. It has been found that germination of most plant seeds occurs slowly at temperatures of below about 15° C. and is very unlikely at temperatures below about 10° C.

One form which the packages may take is that of pellets which are produced by the extrusion of a moist, self-adhesive mixture containing cryoprotected VAM propagules and seeds of a host plant in the form of semi-solid units of a size convenient for inoculation into the soil. These pellets are then preferably lyophylized by first rapidly freezing them in liquid nitrogen or on a surface cooled to a similar low temperature. They are then dried with or without the use of a vacuum and stored until the time of their introduction into the soil.

Another preferred method for packaging VAM fungi is to add them to a cellulosic matrix which contains the cryoprotectant and whose composition is that of a pulp or slurry. Ribbons, pledgets or capsules are then formed using techniques such as those employed in production of paper and related products. Viability of the fungal propagules and plant seeds of such a package is insured by the rapid removal of water from the package such as by mild pressure, followed by lyophylization.

Alternately, the VAM propagules and plant seeds may be applied by means of a methyl cellulose adhesive to the surface of the cellulosic vehicle after removal of most of the water from the cellulosic vehicle. In order to insure viability of the VAM propagules and plant seeds, the package is subjected to a final drying process of lyophylization as described above, whereby further water is removed from the cellulosic vehicle, methyl cellulose, fungal propagules and plant. Thus, drying preferably occurs through the sublimation of water from ice in the package rather than by pressure and heat as in the case of an ordinary paper product.

A plant seed is also mixed with or subsequently applied to the packages so that upon germination, a host plant is produced which is available for achieving a very early symbiotic relationship with the growing fungi. This plant vector is essential to encourage growth of the fungi and to promote prompt deployment of the fungi through the soil to the roots of other plants.

Either before or after lyophylization, the package is enclosed by a membrane permeable to water but strong enough to temporarily contain the root of the developing vector plant by causing it to grow within the capsule. Efficient VAM inoculation is thus assured by retaining the root of the seedling vector plant in proximity to the germination tubes of the fungal propagules during the early stages of growth. Rapid germination of both the plant seed and VAM propagules occurs through the use of material to form the outer membrane which is freely permeable to water and other molecules and which will allow egress of the cryoprotectants. Escape of the plant root from the capsule is assured by the use of a sufficiently thin film to be ruptured by hydrostatic forces within the seedling plant root following infection by the VAM fungi. The membrane can be comprised of one or more polymeric materials such as cellophane, which is wrapped around the package, or polyurethane which is coated upon the package surface.

The mixing process and resulting package could include pelletized sources of phosphorus or other plant nutrients along with microorganisms for solubilizing low grade forms of those nutrients. Due to the soluble or partially soluble character of pellets 26, it is important to effect the formation of the capsules 12 as rapidly as possible so that the pellets within them can be restored to a dry condition before the time delay and sustained release mechanisms are activated by exposure to the moisture in the cellulosic matrix. Thus, with the cryoprotected MF hyphae 34 and MF spores 36 in their dormant state, capsule 12 is rapidly freeze-dried and stored until such time as capsule 12 is placed in the soil, either manually or by means of appropriate agricultural implements.

After planting in the proper environmental conditions of sunlight, temperature, and water, the plant seed 32 and MF hyphae 34 or spores 36 will germinate and begin to grow. The growing plant arising from the seed 32 becomes vector plant 10 of FIG. 1 which develops the first symbiotic relationship with the MF 34 and 36. As the roots of vector plant 10 extend into the soil, new segments are colonized by MF 34 and grow within the soil, thereby permitting some MF to contact the roots of nearby plants. As the hyphae 18 and 24 grow and extend outward from the root system of plants 10, 20, and 22 they effectively enlarge the size of the plant rhizosphere by increasing the area from which phosphorus is obtained from the soil. It is noted that the MF hyphae 19 and 24 may extend 7 to 10 centimeters from their host plant.

In another embodiment of this invention, the phosphate pellet 26 is replaced by one or more phosphorus extraction units containing rock phosphate and biological organisms which act upon the rock phosphate to produce soluble phosphorus which is then transferred to the plant root system in a manner identical to that described above. This alternative phosphorus source may be illustrated by reference to FIG. 4.

Figure 4:
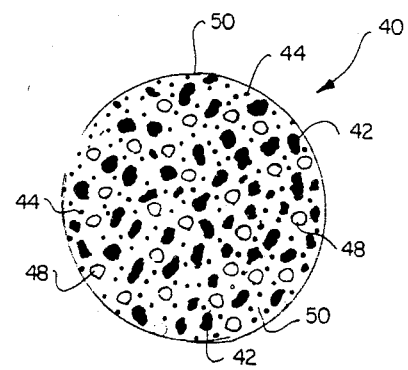
FIG. 4 is a cross-sectional illustration of one preferred embodiment of a rock phosphate source pellet for use in the claimed invention.

The phosphorus extraction unit 40 of FIG. 4 includes a collection of rock phosphate particles 42 which contain insoluble or slightly soluble phosphorus compounds ground to a powder so that the particle sizes are in the range from approximately 5 to approximately 50 micrometers.

Also within extraction unit 40 are microorganisms referred to hereafter as phosphobacteria 44 which include species such as Bacillus and Pseudomonas. Species of phosphobacteria 44 are selected for use based on their ability to ensporulate, to be handled in a dry and a dormant form, to germinate in a gel microenvironment, and to efficiently act upon rock phosphate within the gel to produce soluble phosphorus. These phosphobacteria 44 are propagated under culture conditions in order to provide a large number of specimens in a vegetative state. Upon reaching maturity, the phosphobacteria 44 are subjected to physical conditions which induce them to ensporulate and to enter a dormant state. The dormant spores and bacteria 44 are dried and maintained in a dry and cool condition to provide for optimal handling and storage.

Ensporulated phosphobacteria 44 are mixed with the rock phosphate particles 42 and a dehydrated nutrient hydrogel 48 which contains the constituents necessary to form an effective phosphobacterial growth medium. More precisely, the nutrient hydrogel 48 contains constituents necessary to promote growth of the phosphobacteria 44 following germination, and constituents necessary to sustain such growth for periods ranging from weeks to months. The hydrogel 48 is additionally constituted to maintain the pH within the phosphorus extraction unit 40 at a predetermined level so as to provide optimal conditions for growth of the phosphobacteria 44.

The nutrient hydrogel 48 is comprised of one or more of such gel forming materials as hydroxymethyl cellulose, agar or sugars of large molecular weight with these materials being combined with germination agents and nutrients such as ribosides, gluclose, organic anions, cations, Ca-dipicolinate, and buffering agents. The materials to be used in the gel are mixed to form a homogenous compound which will become hydrated when exposed to water and which will initiate and sustain the growth of phosphobacteria 44 for an extended period of time. The nutrient hydrogel mixture is subsequently dried and ground to a powder having a preferable mean particle size of within the range of approximately 20 to 50 micrometers. A portion of the hydrogel particles 48 may then be coated with a water-retardant agent to provide for time-release of the nutrients and for the staged growth of the phosphobacteria 44, thereby extending the life of the phosphorus extraction process.

The mixture of rock phosphate particles 42, phosphobacteria 44, and hydrogel 48 is then compressed together with an appropriate binder 50 having the property of regulated, slow hydration to form pellets of preferably one to five millimeters in diameter. Each pellet comprises a phosphorus extraction unit 40. The binder 50 is selected on the basis of its ability to unite the constituents of the pellet without injury to the phosphobacteria 44 during compression and for its ability to regulate the entry of moisture into the phosphorus extraction unit 40 over a long period of time so as to permit staged hydration of the nutrient hydrogel 48.

In use, the phosphorus extraction unit 40 remains storable and easily transportable so long as it is kept dry. Temporary exposure to moisture during fabrication of capsules, as is hereinafter described, will not compromise the time delay or sustained release mechanisms of the extraction unit 40 if the capsules are restored rapidly to an appropriate condition of dryness. Upon prolonged exposure to moisture, phosphorus extraction unit 40 provides a support and growth medium for the ensporulated phosphobacteria 44. Hydration of the nutrient hydrogel particles 48 at the surface of the unit makes the nutrients contained therein available to the phosphobacteria 44 which then become active. The invading moisture does not react with all hydrogel particles 48 simultaneously, but rather, the moisture intrudes slowly so that hydration of the dehydrated gel and solvation of the nutrients within hydrogel particles 48 occurs in a time release manner. By this means, the phosphobacteria 44 are provided with a long-term source of nourishment and an appropriate aqueous environment.

After activation of the phosphorus extraction unit 40, the phosphobacteria 44 in the vegetative state begin to act upon the rock phosphate particles 42 within extraction unit 40 such that the phosphorus within those particles is made soluble. The resulting soluble phosphorus is usable for providing nourishment to plant root systems. The phosphorus extraction unit 40 may be placed in the soil near the rhizosphere of a plant root system in order to provide a source of soluble phosphorus for that plant.

Figure 5:
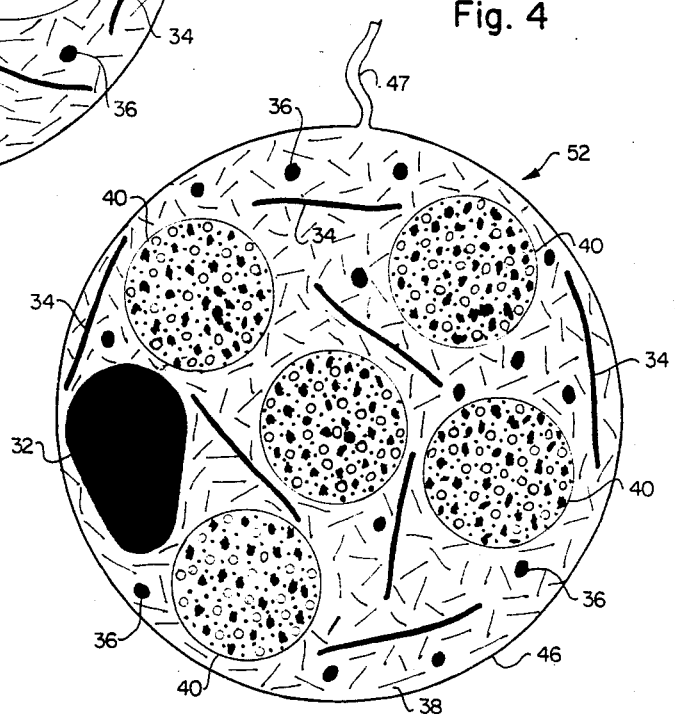
FIG. 5 is a cross-sectional illustration of a capsule which comprises a second preferred embodiment of the present invention.

By reference to FIG. 5, it is seen that one or more phosphorus extraction units 40 may be contained within a phosphorus source capsule 52. By comparison of the phosphorus source capsule 52 of FIG. 5 with the source capsule 12 of FIG. 1, it is noted that the structure and content of both capsules 12 and 52 are identical with the exception that the soluble phosphate fertilizer 28 and its associated coating 30 of FIG. 2 are replaced by one or more rock phosphate extraction units 40 in the phosphorous source capsule 52 of FIG. 4. In all other respects, the source capsule 12, outer membranous envelope and the rock phosphate source capsule 52 are identical in structure, in their method of manufacture, and in the use to which they are applied.

Figure 6:
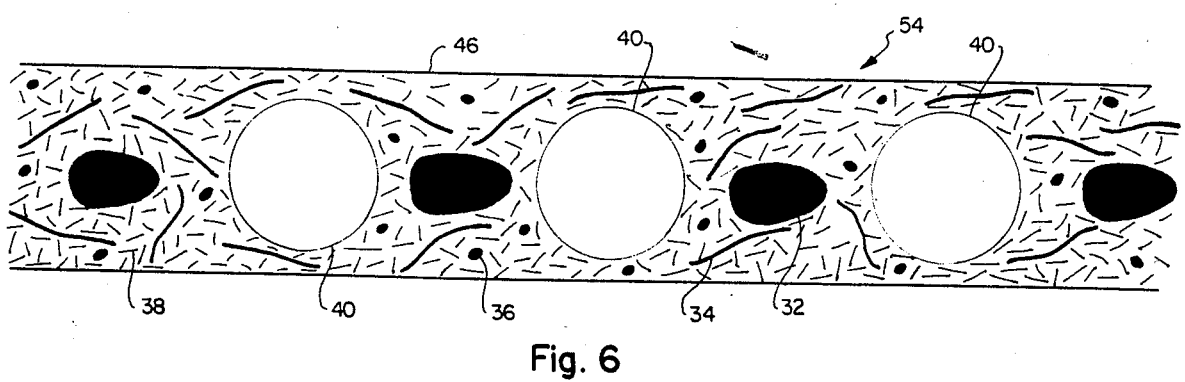
FIG. 6 is a cross-sectional illustration of a ribbon which comprises a third preferred embodiment of the present invention.

By reference to FIG. 6, another preferred embodiment for a phosphorous source is illustrated. In this embodiment, a ribbon 54 constitutes an alternate mode of deployment, as compared to the capsule. By comparison of the phosphorous source ribbon 54 of FIG. 6 with the rock phosphate source capsule 52 of FIG. 5, it is noted that the structure and content is essentially identical with the exception of the physical configuration or positioning of the constituents. For ease of discussion the contents of the phosphorus extraction units 40 in FIG. 6 are not illustrated since the units 40 may optionally be replaced by source capsules 12 as illustrated in FIG. 3. If the phosphorus extraction unit 40 in FIG. 6 is replaced with the source capsule 26 as illustrated in FIG. 3, then it is seen that the constituents and their function in the ribbon 54 embodiment of FIG. 6 is essentially identical to the capsule embodiment 12 of FIG. 3 with the exception of the physical configuration or positioning of the constituents.

In constructing ribbon 54, the method of manufacture employed is similar to that used in producing capsule 12 or capsule 52 with the exception that after the constituents are combined in a self-adhesive mixture, the mixture is formed into a continuous sheet and subsequently into a ribbon configuration using paper forming techniques. The continuous ribbon 54 may be coated after drying with an outer membranous envelope 46 in a manner identical to that described for capsules 12 and 52. The continuous ribbon 54 may be stored in a roll configuration, and mechanically delivered as required for inoculation into the soil.

In using the phosphorus extraction unit 40 as a constituent of either phosphorous source 52 of FIG. 5 or phosphorous source 54 of FIG. 6, the early activity of the constituents is somewhat different than when capsule 26 is used in those phosphorous source embodiments. Like the use of phosphorous source 12, the phosphorous source 52 or 54, containing phosphorus extraction unit 40, is implanted into the soil in the vicinity of one or more seeds or plants. Upon the occurrence of the proper conditions, the MF 34 and MF spores 36 become activated. At essentially the same time, the phosphorus extraction unit 40 permits the activation of the phosphobacteria 44. The nutrient hydrogel 48 begins providing a bacterial growth environment, and the rock phosphate particles 42 provide a substratum upon which the phosphobacteria 44 act. At this point, the MF 34 and MF spores 36 begin developing a symbiotic relationship with roots produced by the phosphorus-tolerant plant seed 32. Following the development of functional relations between the fungi 34 and 36 and the plant seed 32, some of the hyphae 34 begin extending outwardly from the roots and from the phosphorous source capsule 52 or ribbons 54.

Upon establishment of a symbiotic relationship with a plant root system, MF 34 begin to translocate soluble phosphorus from the phosphorus extraction unit 40 to the plant to which they are connected. From this point, the relationship between the MF 34, the root system (not shown) and the phosphorus extraction unit 40 is identical to that which was described previously between the MF 34, the plant root system, and the soluble phosphate fertilizer 28 from source capsule 26 (as depicted in FIG. 3).

The process disclosed herein overcomes the long standing problem of producing vesicular-arbuscular endomycorrhizal fungi in sufficient quantities for large-scale use in nourishing growing plants. Further, this process overcomes the corresponding problem of producing such fungi in a manner which would permit their storage and transportation prior to use in connection with the nourishment of growing plants.

The process and apparatus for producing and storing MF comprises a means for overcoming the above-described problems by: (1) providing methods of propagating and growing large numbers of vesicular-arbuscular endomycorrhizal fungi through use of actual soil techniques or through use of hydroponic growth methods so as to greatly increase the numbers of vesicular-arbuscular endomycorrhizal propagules available for plant inoculation; (2) identifying methods of promoting vesicular-arbuscular endomycorrhizal fungi ensporulation and dormancy; (3) disclosing a means by which the vesicular-arbuscular endomycorrhizal fungi may be stored and transported without injury; and (4) describing a method of combining the dormant fungi with seeds of an appropriate species of plant in a package which may be easily inoculated into the soil so as to provide a plant which encourages growth of the fungi and subsequent inoculation of crop or other plants.

From the foregoing description it will be appreciated that in addition to the problems solved by the above-described process for producing and storing MF, the novel phosphorus delivery system disclosed herein clearly overcomes many of the longstanding problems in the art by (1) providing a means for delivering soluble phosphorus to plant root systems without appreciable adsorptive loss of the phosphorus to clay minerals in the surrounding soil; (2) providing a means for supplying soluble phosphorus from rock phosphate without the present complex commercial processes of refinement; (3) providing a phosphorus supply which is available to plant root systems over an extended time period; (4) providing a means for delivering phosphorus to plural plant root systems; (5) providing a means for balancing the overall phosphorus level in plural plant systems so as to transfer phosphorus from those plants having adequate or excess phosphorus to those plants deficient in phosphorus; and (6) providing a means which operates after introduction of plant beneficial fungal microorganisms into soil environments for encouraging the growth and distribution of the microorganisms within the soil environment. In addition, the components of this system are all contained in a form which permits storage and facilitates their handling, transporting and implantation into the soil without harm to the biological components of the system.

The invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of preparing microorganisms for use in plant inoculation comprising the steps of:
    obtaining microorganisms suitable for encouraging plant growth;
    propagating the microorganisms in association with host plants;
    regulating chemical constituents which are available to the microorganisms and to their host plants so as to induce the microorganisms to leave a vegetative state of growth and to enter a state of natural dormancy, the regulating step comprising at least one of:
    (a) promoting maturation of the host plants;
    (b) harvesting leafy portions of the host plants; and
    (c) modifying the growth conditions of the host plants; and
    packaging the dormant microorganisms in proximity to a vector plant seed so as to ensure viability during storage and transportation and to permit their subsequent activation in association with the roots of a vector plant.

2. A method of preparing mycorrhizal fungal microorganisms as propagules for use in plant inoculation comprising the steps of:
    obtaining mycorrhizal fungal microorganisms suitable for encouraging plant growth;
    growing the microorganisms on a support medium in proximity to at least one propagative host plant so as to encourage the development of a symbiotic association between said microorganisms in a vegetative state and at least one of said propagative host plants;
    inducing the microorganisms to leave the vegetative state and to enter a state of dormancy, said inducing step comprising at least one of:
    (a) promoting maturation of said propagative host plants;
    (b) harvesting leafy portions of said propagative host plants; and
    (c) modifying the growth conditions of said propagative host plants;
    dissociating the support medium and propagative host plant portions containing the dormant microorganism propagules;
    combining the dissociated propagative host plant portions, microorganism propagules, and support medium with at least one vector plant seed; and
    forming the combination into at least one package containing propagative host plant portions, microorganism propagules, support medium and at least one vector plant seed, said package being of a configuration and size facilitating placement of said package into soil near recipient plant root systems for promoting recipient plant fertilization and nourishment upon activation of the microorganisms.

3. A method as defined in claim 2 further comprising the step of placing said package in proximity to the recipient plant root systems so as to induce activation of said microorganisms and to encourage development of a symbiotic relationship between said recipient plant root systems and said microorganisms.

4. A method as defined in claim 2 wherein the support medium comprises a fibrous pulp material selected from the group consisting of wood fiber, cotton, linen, hemp and synthetic polymeric fibers.

5. A method as defined in claim 2 wherein the support medium is comprised of soil.

6. A method as defined in claim 5 further comprising the steps of:
  inducing the mycorrhizal fungal microorganisms to produce sporocarps, said sporocarps having propagules in a state of natural dormancy; and
  harvesting the sporocarps.

7. A method as defined in claim 6 wherein the dissociating step includes the step of dissociating the sporocarps along with the support medium and propagative host plant portions.

8. A method as defined in claim 7 wherein the combining step includes the step of combining the dissociated sporocarps with the dissociated propagative host plant portions, microorganism propagules, support medium, vector plant seed and a cellulosic matrix.

9. A method as defined in claim 8 wherein the combining step further comprises the step of mixing the dissociated sporocarps, propagative host plant portions, microorganism propagules, support medium, vector plant seed and cellulosic matrix in water so as to form a mixture comprising a slurry or pulp.

10. A method as defined in claim 2 wherein the combining step additionally includes combining the dissociated propagative host plant portions, microorganism propagules, support medium and vector plant seed with a cellulosic matrix so as to provide further support for the combined mixture.

11. A method as defined in claim 10 wherein the combining step further comprises the step of mixing the dissociated propagative host plant portions, microorganism propagules, support medium, vector plant seed and cellulosic matrix in water so as to form a mixture comprising a slurry or pulp.

12. A method as defined in claim 11 wherein the forming step comprises the step of dividing the mixture into plural packages, each package containing propagative host plant portions, microorganism propagules, support medium, and at least one vector plant seed.

13. A method as defined in claim 2 further comprising the step of cryoprotecting the dormant microorganisms.

14. A method as defined in claim 13 wherein the step of cryoprotecting the dormant microorganisms comprises the step of immersing the dissociated support medium, propagative host plant portions and microorganism propagules in an aqueous mixture of cryoprotectant agents.

15. A method as defined in claim 14 wherein the cryoprotectant agents include glycerol and sugars.

16. A method as defined in claim 13 wherein the forming step includes the step of extruding the combination through apertures at low pressure and freeze-drying it so as to form the package.

17. A method as defined in claim 13 wherein the steps of dissociating, combining and forming are performed rapidly and at temperatures of up to about 15° C. above the freezing point of water to prevent germination of the plant seed.

18. A method as defined in claim 17 wherein the steps of dissociating, combining and forming are performed at temperatures in the range of about 4° C. to about 10° C. above the freezing point of water.

19. A method as defined in claim 18 wherein the steps of dissociating, combining and forming are performed at temperatures in the range of about 4° C. to about 6° C. above the freezing point of water.

20. A method as defined in claim 13 further comprising the step of rapidly freezing and drying the package at low temperatures to ensure viability of the vector plant seed and microorganism propagules.

21. A method as defined in claim 2 further comprising the step of enclosing the package in a membrane material which is permeable at least to water, said membrane being configured so as to permit escape of vector plant seed roots after infection of said roots by the microorganisms.

22. A method of preparing mycorrhizal fungal microorganisms for use in plant inoculation comprising the steps of:
  obtaining a viable source of vesicular-arbuscular mycorrhizae;
  obtaining a vector plant seed;
  growing the vesicular-arbuscular mycorrhizae in proximity to one or more propagative host plant root systems so as to encourage development of a symbiotic association between said mycorrhizae and said propagative host plant root systems;
  supporting the vesicular-arbuscular mycorrhizae and the propagative host plant root systems in a cellulosic support medium;
  inducing the vesicular-arbuscular mycorrhizae to ensporulate;
  terminating the growth of the propagative host plant root systems;
  inducing the vesicular-arbuscular mycorrhizae to enter a state of dormancy in response to the termination of growth of the propagative host plant root systems;
  separating the vesicular-arbuscular mycorrhizae, associated propagative host plant root systems and support medium from the remainder of the propagative host plant;
  cryoprotecting the vesicular-arbuscular mycorrhizae;
  combining the vesicular-arbuscular mycorrhizae, the propagative host plant root systems, the vector plant seed and the support medium with an adhesive cellulosic material so as to form a mixture;
  forming the mixture into a package of a size and configuration convenient for inoculation into soil; and
  drying the package at low temperatures.

23. A method as defined in claim 22 wherein the step of inducing dormancy further comprises the step of reducing the levels of temperature, nutrients, root gases, light and moisture to which the vesicular-arbuscular mycorrhizae are exposed.

24. A method as defined in claim 22 wherein the step of cryoprotecting the vesicular-arbuscular mycorrhizae comprises the step of immersing the root systems, associated vesicular-arbuscular mycorrhizae and support medium in an aqueous mixture of cryoprotectant agents.

25. A method as defined in claim 22 further comprising the step of enclosing the package in a membrane material which is permeable at least to water, said membrane being configured so as to permit escape of vector plant seed roots after infection of said roots by the microorganisms.

26. A method of preparing microorganisms for use in plant inoculation comprising the steps of:
  obtaining a viable source of the epigeous species of mycorrhizal fungus;
  obtaining a vector plant seed;
  placing the mycorrhizae in proximity to one or more propagative host plants so as to encourage development of a symbiotic association between said mycorrhizae and said propagative host plants;

growing the mycorrhizae and the propagative host plants in soil so as to encourage said mycorrhizae to produce sporocarps epigeously;

harvesting the sporocarps;

inducing the mycorrhizae to enter a state of dormancy;

separating the mycorrhizae and portions of the host plant supporting said mycorrhizae from the remainder of the host plant and soil;

combining the mycorrhizae, the associated host plant portions, the sporocarps and the vector plant seed with an adhesive cellulosic matrix so as to form a mixture;

forming the mixture into a package of a size and configuration convenient for inoculation into soil; and drying the package at low temperatures.

27. A method as defined in claim 26 wherein the step of inducing dormancy further comprises the step of reducing the levels of temperature, nutrients, root gases, light and moisture to which the mycorrhizae are exposed.

28. A method of producing a device for delivering phosphorus to recipient plants without adsorptive loss to soil constituents comprising the steps of:

obtaining a support structure;

placing a package within the support structure, said package comprising at least one source of soluble phosphorus, said source of soluble phosphorus being configured so as to provide for time release of the soluble phosphorus into portions of the support structure surrounding the package;

supporting a vector plant seed within the support structure such that the roots of the vector plant seed will interdigitate with the recipient plant to be fertilized; and supporting a plurality of first microorganisms within the support structure, said first microorganisms being capable of transferring nutrients from the vector plant to the root systems of the recipient plants to be fertilized.

29. A method as defined in claim 31 wherein the step of placing the package within the support structure comprises the steps of:

obtaining a supply of soluble phosphorus;

applying a coating around the soluble phosphorus so as to form a pellet; and supporting the pellet within the support structure.

30. A method as defined in claim 28 wherein the step of placing the package within the support structure comprises the steps of:

obtaining a concentration of rock phosphate;

positioning a plurality of second microorganisms near the rock phosphate so as to permit said second microorganisms to act upon said rock phosphate and produce soluble phosphorus; and supporting the rock phosphate and the second microorganisms within the support structure.

31. A method as defined in claim 30 wherein the step of supporting the rock phosphate and the second microorganisms within the support structure comprises the steps of:

obtaining a phosphate support structure;

positioning the rock phosphate and second microorganisms within the phosphate support structure so as to maintain those constituents in close physical position; and introducing the phosphate support structure within the support structure.

32. A method as defined in claim 31 wherein the step of introducing the phosphate support structure is preceded by the steps of:

obtaining a concentration of nutrients capable of encouraging growth and activity in the second microorganisms;

combining the nutrients with a slightly soluble hydrogel mass, said hydrogel mass being designed to slowly dissolve and permit the gradual release of said nutrients upon extended contact with moisture; and situating the hydrogel mass containing the nutrients within the phosphate support structure.

33. A method as defined in claim 30 wherein the step of positioning a plurality of second microorganisms near the rock phosphate comprises the step of positioning, near said rock phosphate, a plurality of bacteria which are capable of acting on said rock phosphate so as to produce soluble phosphorus.

34. A method as defined in claim 28 further comprising the step of introducing a plurality of spores from the microorganisms within the support structure.

35. A method as defined in claim 28 wherein the step of supporting a plurality of first microorganisms within the support structure comprises the steps of:

introducing a plurality of dormant first microorganisms within the support structure; and introducing a plurality of dormant spores from the first microorganisms within the support structure.

36. A method as defined in claim 28 further comprising the step of applying an adhesive binder to the support structure so as to maintain said support structure in a desired physical configuration.

37. A method as defined in claim 28 further comprising the step of enclosing the support structure in a membrane material which is permeable at least to water, said membrane being configured so as to permit escape of vector plant seed roots after infection of said roots by the microorganisms.

38. A method of producing a device for delivering phosphorus to recipient plants without adsorptive loss to soil constituents comprising the steps of:

obtaining a cellulosic support structure which is capable of maintaining the biologically active components of the device in a desired physical configuration with a source of soluble phosphorus;

introducing at least one source of soluble phosphorus within the support structure, said source of soluble phosphorus forming a bounded unit positioned within the support structure, and said source of soluble phosphorus being configured so as to provide for time release of the soluble phosphorus into portions of the support structure surrounding said bounded unit;

supporting a vector plant seed within the support structure so as to produce a vector plant, said plant having roots associated with the cellulosic support structure;

introducing a plurality of mycorrhizal fungi propagules within the support structure so as to develop inter-root connections between the vector plant and the recipient plants to be fertilized such that phosphorus is transferred from the vector plant to the root systems of the recipient plants to be fertilized; and providing plant nutrients within the support structure so as to provide nourishment to the vector plant seed as it germinates and produces a vector plant.

39. A method as defined in claim 38 further comprising the step of providing plural spores from the mycorrhizal fungi within the support structure.

40. A method as defined in claim 38 wherein the step of introducing mycorrhizal fungi within the support structure comprises the steps of:
   introducing a plurality of dormant mycorrhizal fungi within the support structure; and
   introducing a plurality of spores from the mycorrhizal fungi within the support structure.

41. A method as defined in claim 38 further comprising the step of enclosing the support structure in a membrane material which is permeable at least to water, said membrane being configured so as to permit escape of vector plant seed roots after infection of said roots by the mycorrhizal fungi.

42. A method of delivering phosphorus to recipient plants without adsorptive loss to soil constituents comprising the steps of:
   obtaining a support structure;
   providing at least one source of soluble phosphorus within the support structure, said source of soluble phosphorus forming a bounded unit positioned within the support structure and said source of soluble phosphorus being configured so as to provide for time release of the soluble phosphorus into the portion of the support structure surrounding said bounded unit;
   supporting a vector plant seed within the support structure;
   introducing within the support structure a plurality of propagules of plant beneficial microorganisms which are capable of developing inter-root connections between the vector plant seed and the recipient plant root systems such that phosphorus is transferred from the vector plant seed to the recipient plant root systems;
   situating the support structure within a soil environment; and
   adjusting the conditions of the soil environment so as to induce germination and growth of the vector plant seed and of the propagules of microorganisms such that the microorganisms enter a symbiotic inter-root relationship with the vector plant seed root system and the root system and the root systems of the recipient plants to be fertilized such that the inter-root microorganisms transfer phosphorus via the vector plant from the phosphorus source to said root systems of the recipient plants to be fertilized.

43. A method as defined in claim 42 wherein the situating step is preceded by the step of enclosing the support structure in a membrane material which is permeable at least to water, said membrane being configured so as to permit escape of vector plant seed roots after infection of said roots by the microorganisms.

44. A package for assisting in plant nourishment comprising:
   a cellulosic matrix;
   plural dormant vesicular-arbuscular mycorrhizae contained within the cellulosic matrix;
   a plant seed supported within the cellulosic matrix;
   portions of plants contained within the cellulosic matrix; and
   self-adhesive cellulosic material mixed with said cellulosic matrix to retain the package in a desired physical configuration.

45. A package as defined in claim 44 wherein the cellulosic matrix and cellulosic material form a porous structure comprising a pledget.

46. A package as defined in claim 44 wherein the self-adhesive cellulosic material forms the package into a physical configuration comprising a pellet.

47. A package as defined in claim 44 wherein the cellulosic matrix and self-adhesive cellulosic material form a ribbon which supports the vesicular-arbuscular mycorrhizae and plant seed.

48. A package as defined in claim 44 further comprising a membrane material enclosing the cellulosic matrix, said membrane being configured so as to permit escape of plant seed roots after infection of said roots by the vesicular-arbuscular mycorrhizae.

49. An apparatus for delivering phosphorus to recipient plants without adsorptive loss to soil constituents comprising:
   a support means;
   at least one source of phosphorus associated with the support means, said source of phosphorus forming a bounded unit positioned within the support means, and said source of phosphorus being configured so as to provide for time release of the phosphorus into portions of the support means surrounding said bounded unit;
   a vector plant seed associated with the support means for providing a vector plant such that the vector plant seed roots will come to interdigitate with the roots of the recipient plants to be fertilized; and
   a plurality of mycorrhizal fungal microorganisms associated with the support means as propagules of interroot microorganisms for transferring nutrients from the vector plant root systems to the roots of the recipient plants to be fertilized.

50. An apparatus as defined in claim 49 wherein the support means comprises a cellulosic material capable of supporting the phosphorous source, microorganisms, and vector plant seed.

51. An apparatus as defined in claim 49 wherein each phosphorous source comprises a concentration of soluble phosphorus.

52. An apparatus as defined in claim 49 wherein each phosphorous source comprises:
   a supply of rock phosphate; and
   a plurality of second microorganisms positioned near the rock phosphate, said second microorganisms acting upon said rock phosphate so as to produce soluble phosphorus.

53. An apparatus for delivering phosphorus to recipient plants without adsorptive loss to soil constituents comprising:
   a cellulosic support structure which includes a cellulose matrix;
   at least one source of soluble phosphorus associated with the support structure, said source of soluble phosphorus forming a bounded unit positioned within the support structure, and said source of soluble phosphorus being configured so as to provide for time release of the soluble phosphorus into portions of the support structure surrounding said bounded unit;
   a vector plant seed associated with the support structure for providing a vector plant; and
   a plurality of microorganisms associated with the support structure for transferring phosphorus to vector plant root systems.

54. An apparatus as defined in claim 53 further comprising nutrients associated with the support structure for providing nourishment to the vector plant seed as it germinates and produces a plant.

55. An apparatus as defined in claim 53 wherein the microorganisms are in a dormant state prior to exposure of said apparatus to moisture.

56. An apparatus as defined in claim 53 wherein the cellulosic support structure comprises a material capable of supporting the phosphorous source, microorganisms, and the vector plant seed in the support structure cellulose matrix.

57. An apparatus as defined in claim 53 wherein the phosphorous source comprises:
   a supply of rock phosphate;
   a plurality of second microorganisms positioned near the rock phosphate, said second microorganisms acting upon said rock phosphate so as to produce soluble phosphorus.

58. An apparatus as defined in claim 57 wherein the second microorganisms comprise bacteria which are capable of acting on the rock phosphate so as to produce soluble phosphorus.

59. An apparatus as defined in claim 57 further comprising a second support structure associated with the rock phosphate and second microorganisms for providing support therefor, and for maintaining those constituents in close physical position.

60. An apparatus as defined in claim 59 additionally comprising at least one means for providing nutrients to the second microorganisms in time delay fashion.

61. An apparatus as defined in claim 60 wherein the means for providing nutrients comprises:
   a concentration of nutrients capable of encouraging growth and activity in the second microorganisms; and
   a hydrogel mass which includes the nutrients, said hydrogel mass being designed to slowly dissolve and permit the gradual release of said nutrients upon extended contact with moisture.

62. An apparatus as defined in claim 53 additionally comprising means for maintaining said apparatus in a desired physical configuration.

63. An apparatus as defined in claim 62 wherein said maintaining means comprises a self-adhesive binder material which is combined with the cellulosic support structure for maintaining said apparatus in a desired configuration.

64. An apparatus as defined in claim 53 further comprising spores of the microorganisms associated with the support structure.

65. An apparatus as defined in claim 53 further comprising a membrane material enclosing the cellulosic support structure, said membrane being configured so as to permit escape of vector plant seed roots after infection of said roots by the microorganisms.

66. An apparatus for delivering phosphorus to recipient plants without adsorptive loss to soil constituents comprising:
   a cellulosic support structure being capable of maintaining the apparatus in a desired physical configuration;
   at least one source of soluble phosphorus positioned within the support structure, said source of soluble phosphorus forming a bounded unit positioned within the support structure, and said source of soluble phosphorus being configured so as to provide for time release of the soluble phosphorus into portions of the support structure surrounding said bounded unit;
   a vector plant seed positioned within the support structure so as to provide a vector host plant; and
   a plurality of mycorrhizal fungi positioned within the support structure so as to provide for transfer of phosphorus to plant root systems.

67. An apparatus as defined in claim 66 further comprising spores of the mycorrhizal fungi, said spores being positioned within the support structure.

68. An apparatus as defined in claim 47 wherein the mycorrhizal fungi and spores are at least initially in a dormant state prior to exposure of said apparatus to moisture.

69. An apparatus as defined in claim 68 further comprising a membrane material enclosing the cellulosic support structure, said membrane being configured so as to permit escape of vector plant seed roots after infection of said roots by the mycorrhizal fungi.

* * * * *

UNITED STATES PATENT AND TRADEMARK OFFICE
CERTIFICATE OF CORRECTION

PATENT NO.    : 4,589,226
DATED         : May 20, 1986
INVENTOR(S)   : Larry J. Stensaas It is certified that error appears in the above-identified patent and that said Letters Patent is hereby corrected as shown below:

Column 2, line 2, "compound" should be --compounds--
    Column 2, lines 10-11, "abovede-scribed" should be --above-described--
    Column 2, lines 12-13, "soil, however," should be --soil; however,"
    Column 2, line 64, "the move" should be --then move--
    Column 3, line 27, "as efficient mode" should be --as efficient a mode--
    Column 5, line 18, "for does not" should be --or does not--

Column 7, lines 9-10, "characteristics" should read -- characteristic --.

Column 7, line 49, "are one" should read -- is one --.

Signed and Sealed this

Sixteenth Day of September 1986

[SEAL]

Attest:

DONALD J. QUIGG

*Attesting Officer*  *Commissioner of Patents and Trademarks*